US009702154B2

(12) United States Patent
Wessendorf

(10) Patent No.: US 9,702,154 B2
(45) Date of Patent: Jul. 11, 2017

(54) STRUCTURAL ARRANGEMENT AND METHOD FOR SECURING SCAFFOLDING TO A BUILDING WALL

(71) Applicant: Wessendorf Systembeschichtungen GmbH, Emstek (DE)

(72) Inventor: Franz Wessendorf, Emstek (DE)

(73) Assignee: Wessendorf Systembeschichtungen GmbH, Emstek (DE)

( * ) Notice: Subject to any disclaimer, the term of this patent is extended or adjusted under 35 U.S.C. 154(b) by 0 days.

(21) Appl. No.: 14/780,028

(22) PCT Filed: Mar. 27, 2014

(86) PCT No.: PCT/DE2014/100105
§ 371 (c)(1),
(2) Date: Sep. 25, 2015

(87) PCT Pub. No.: WO2014/154207
PCT Pub. Date: Oct. 2, 2014

(65) Prior Publication Data
US 2016/0047132 A1   Feb. 18, 2016

(30) Foreign Application Priority Data

Mar. 27, 2013   (DE) .................. 10 2013 103 172
Mar. 27, 2013   (DE) .................. 20 2013 101 353 U

(51) Int. Cl.
*E04F 19/00*   (2006.01)
*E04H 14/00*   (2006.01)
(Continued)

(52) U.S. Cl.
CPC ............ *E04G 5/046* (2013.01); *F16B 13/141* (2013.01)

(58) Field of Classification Search
CPC ......... E04G 5/046; E04G 5/04; F16B 13/141; F16B 13/04; Y10S 411/903; F24J 2/5245; A61G 12/005
(Continued)

(56) References Cited

U.S. PATENT DOCUMENTS 596,151 A * 12/1897 Funcke .................... E04G 5/04
                                                182/118
4,642,964 A *  2/1987 Kellison ............... E04B 1/4121
                                                52/699
5,060,436 A * 10/1991 Delgado, Jr. ......... B28B 23/005
                                                52/295

(Continued)

FOREIGN PATENT DOCUMENTS

DE   2908405 A1   9/1980
DE   7905976 U1   6/1982
(Continued)

OTHER PUBLICATIONS

Translation of Weis (DE 201110107954) found at espacenet.com.*
(Continued)

*Primary Examiner* — Brian Mattei
(74) *Attorney, Agent, or Firm* — Stephan A. Pendorf; Patent Central LLC

(57) ABSTRACT

A structural arrangement for securing scaffolding to a building wall. The structural arrangement includes the building wall with a recess, a façade anchor secured to the building wall and having a receptacle for accommodating at least one securing element. The securing element engages in the receptacle in the façade anchor on the one hand and in the recess in the wall on the other hand. The façade anchor provides a supporting face facing the building wall. A compensating material is provided between the supporting face and the building wall in such a manner that the façade (Continued)

Figure 1:
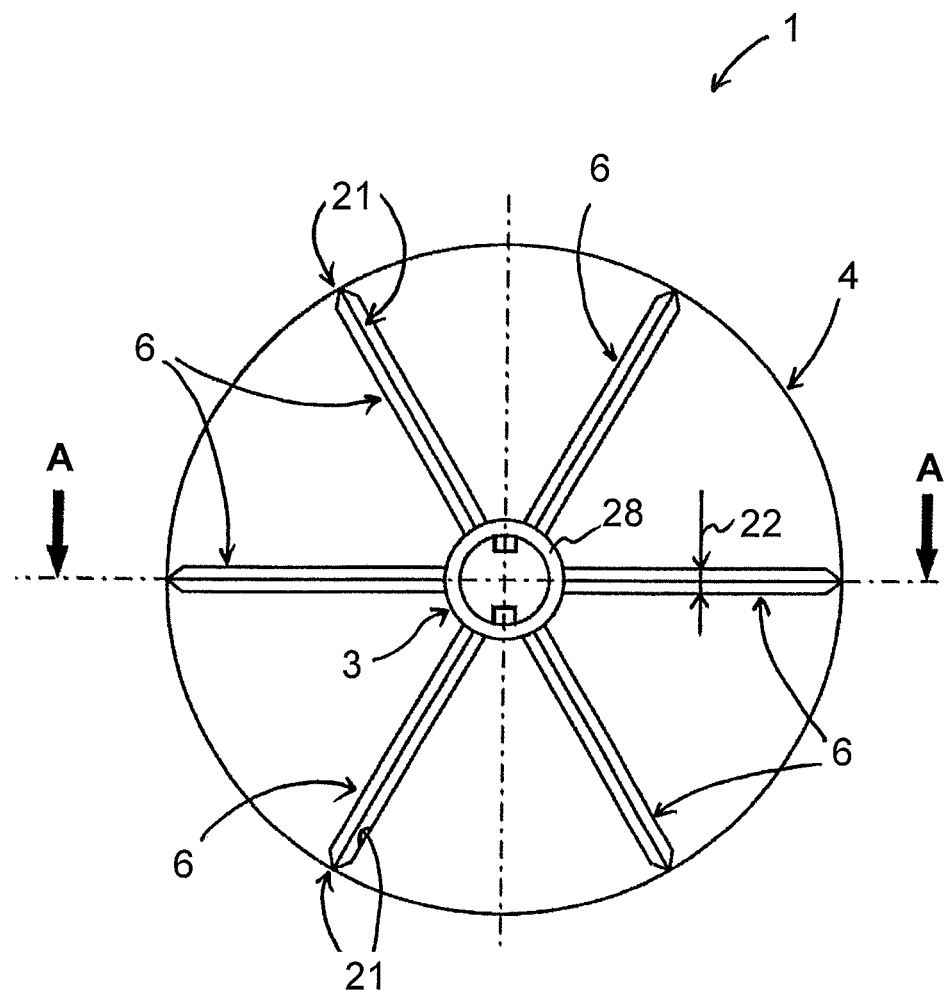

anchor makes contact over its supporting face with, and is supported by the building wall indirectly via, the compensating material.

7 Claims, 10 Drawing Sheets

(51) Int. Cl.
*E04G 5/04* (2006.01)
*F16B 13/14* (2006.01)

(58) Field of Classification Search
USPC .......................................................... 52/699
See application file for complete search history.

(56) References Cited

U.S. PATENT DOCUMENTS

| | | | | |
|---|---|---|---|---|
| 5,562,377 A | * | 10/1996 | Giannuzzi | F16C 17/10 |
| | | | | 405/259.5 |
| 5,807,051 A | * | 9/1998 | Heminger | F16B 13/141 |
| | | | | 411/82 |
| 5,857,817 A | * | 1/1999 | Giannuzzi | C09J 9/005 |
| | | | | 405/259.5 |
| 2008/0179477 A1 | * | 7/2008 | Harney | E04G 5/046 |
| | | | | 248/238 |

FOREIGN PATENT DOCUMENTS

| | | |
|---|---|---|
| DE | 8304713 U1 | 8/1983 |
| DE | 29721364 U1 | 2/1998 |
| DE | 102011107954 A1 | 1/2013 |
| EP | 2525107 A1 | 11/2012 |
| GB | 2245673 A | 1/1992 |
| GB | 2413164 A | 10/2005 |
| JP | 01208125 A * | 8/1989 |
| JP | 2005314881 A | 11/2005 |

OTHER PUBLICATIONS

Translatoin of Tadashi (JP 2005314881) found at espacenet.com.*
Translation of Henning (EP 2,525,107) found on Espacenet at: http://translationportal.epo.org/emtp/translate/?ACTION=description-retrieval&COUNTRY=EP&ENGINE=google&FORMAT=docdb&KIND=A2&LOCALE=en_EP&NUMBER=2525107&OPS=ops.epo.org/3.2&SRCLANG=de&TRGLANG=en.*
International Preliminary Report on Patentability in International Application No. PCT/DE2014/100105, dated Sep. 29, 2015.
International Search Report in International Application No. PCT/DE2014/100105, dated Jul. 28, 2014.

* cited by examiner

STRUCTURAL ARRANGEMENT AND METHOD FOR SECURING SCAFFOLDING TO A BUILDING WALL

The invention relates to a structural arrangement for attaching a scaffold to a building wall, comprising the building wall with a recess, a façade anchor fixed to the building wall having a receptacle for at least one attaching means and the attaching means, which engages on the one hand into the receptacle of the façade anchor and on the other hand into the recess. Furthermore, the invention relates to a method for attaching at least temporarily a scaffold to a building wall.

To be able to perform any work on a façade of a building or other structure safely, quickly and in accordance with the applicable health and safety policies, in many cases a framework will be provided, which provides craftsmen with access to the façade at high elevations and at the same time provides stability and permits freedom of movement. Typically, the framework is supported or attached to the façade of a building having wall. For a long time it was customary in this case to introduce a recess into the building wall, in particular a bore, and by means of a dowel set in the bore to anchor an eyebolt on the building wall. The eyebolt was screwed with its threads into a threaded portion of the dowel. A head of the eyebolt with a loop remains outside the façade. Subsequently, a connection element of the scaffold, in particular a connecting hook is inserted into the eyelet of the eyebolt. Thereby, it becomes possible to secure the scaffold to the building wall via the eyebolt.

Problems may occur in these procedures, which have been tried and tested over many years, if, for example, for providing an insulating façade, the scaffolding must be set up a distance of up to 30 cm or more from the building wall, so that an outer insulation can be built up between building wall and scaffolding. In this case, a comparatively long shaft must be provided between the threaded portion and the head of the eyebolt. In the event that transverse forces are introduced into the eyebolt during the construction of the scaffold or the work on the façade, this can deform plastically and, in particular, bend. If the bent eyebolt is then removed after production of the façade, an unnecessarily large, in particular funnel-shaped, recess is newly produced in the façade, which is permanently visible to an observer and bothersome even after a subsequent patching.

In particular, in the construction of thermal insulation systems or other external insulation it is desired to find new solutions for scaffolding anchoring. For example, a fastening device is known, in which, for forming a connection point between the scaffolding and the building wall, first two threaded rods are provided spaced apart and projecting substantially perpendicular from the building wall, which are each fixed to the building wall via dowels or other suitable holding means. Between the threaded rods a transverse connection cross-member, made in particular of a perforated sheet, is then provided. A connecting hook associated with the scaffolding then engages in a recess of the connection cross-member. Here, transverse forces on the laterally staggered threaded pins can be considerably better supported on the building wall, as compared to the case of a single eyebolt fixed on a dowel in the building wall. In addition, the transverse cross-member allows, with the different recesses, a positional or tolerance compensation. As a result of this compensation, the connection of the scaffold to the fastening device is designed to be flexible, so that in particular transverse forces induced due to positional tolerances can be avoided or reduced. However, the structure of the system is complicated because two recesses need to be provided in the building wall.

From the utility model DE 83 04 713 U1 it is known to provide on the building wall a so-called permanent façade anchor, which is secured to the building wall by screwing in. The façade anchor has on the one hand, in the mounted state, an abutting portion extending parallel to the building wall, having a contact surface which abuts on the building wall adjacent to the fitting. Further, a sleeve, in particular a threaded sleeve, is provided for receiving an eyebolt. The eyebolt serves here for connecting the building wall and scaffolding. Between the sleeve and the abutment portion a support portion is provided. In particular, it is known that the support portion is defined by a triangular plate shape or rib-like struts provided between the sleeve and the bearing section. Forces introduced via the eyebolt into the façade anchor are supported, via the sleeve and the support portion of the abutment portion, on the building wall itself. However, since the façade anchor is preferably made of steel for the realization of a sufficient stability, and since the façade anchor permanently remains in the façade, a cold bridge is formed going through the insulating outer layer which had been provided specifically for insulation, which significantly reduces the efficiency of the external insulation.

From DE 10 2011 107 954 A1 a façade anchor is known, which is in several parts. A central body with a continuous longitudinal recess is placed with a contact surface against a building wall. A ring bolt or other fastening means for the framework is introduced into the longitudinal recess. The screw is fixed by a separate dowel in a recess in the building wall. Stiffening ribs are provided, for example, at the central body, which offer a high degree of stability and serve to receive transverse forces acting on the bolt or support.

From EP 525 107 A1, a further façade anchor is known having a substantially frustum-shaped base body. The scaffold anchor provides as end faces of the truncated cone two boundary surfaces with oppositely lying circular cross-section. Between the two end faces there is a cylindrical portion from which radially protruding ribs extend. Furthermore, a bore is provided concentrically through the façade anchor, which extends from a first end face to an opposite second end face. A connecting means is introduced into one side of the through-bore for securing the scaffolding to the building wall. On the opposite side, an eyebolt or other fastener can be introduced to connect the scaffolding to be secured to the façade anchor. The façade anchor remains with the planar shaped circular end face on the building wall after production of the façade, in particular after the attachment of insulation in the façade.

It is the object of the present invention to provide improved options for fast and reliable securing of a scaffold on a building wall. In order in particular to take into account safety requirements, the securing should occur in a particular manner, and in particular statically calculated.

To achieve the object, the invention is characterized, in conjunction with the preamble of claim 1, in that the façade anchor has a building wall facing support surface and that a compensating or leveling material is provided between the supporting surface and the building wall, such that a surface contacting and supporting of the façade anchor on the building wall is realized indirectly via the compensating material.

The particular advantage of the invention is that due to the provision of the compensating or leveling material it can be ensured that the façade anchor lies flat against the building wall. The planar surface contact of the anchor on the building wall is a prerequisite for ensuring that forces in the area of the contact element are distributed on the building wall. In this respect the provision of the compensating material is a mandatory requirement for being able to calculate the forces on the façade anchor or to calculate the forces that occur in relation to the securing of the façade anchor on the building wall. Since every real building wall will have unevenness, a dispensing with the compensating material will bring about that a planar contact of the façade anchor on the building wall can not be ensured. It could result in a local, and in extreme cases a purely pin-point, supporting the façade anchor on the building wall. Here, impermissibly high forces occur and the building wall or the façade anchor could be damaged in extreme cases.

According to a preferred embodiment of the invention the compensating material is comprised of a curable material. In particular, the compensating material can be formed from a fracture-resistant material. For example, two material components are provided for the compensating material. Advantageously, by providing a curable material during assembly, the surface contact of the façade anchor on the building wall can be made at any time as long as the compensating material has not yet cured. Once the compensating material has hardened, then forces introduced via the façade anchor to be supported on the building wall can be applied. As compensating material according to the invention, for example, 2-component adhesives or mineral materials can be used, which are self-hardening. For example, cement or other mineral material may be provided. In particular, the compensating material can be designed pressure-stable and transmit pressure forces in a defined manner preferably without undue large deformations.

According to a further development of the invention, the façade anchor includes a sleeve, which is elongated and oriented substantially perpendicular to the support surface. The sleeve has a receptacle for the attaching means. In the region of a free end portion, in particular a lateral surface, of the sleeve may be provided surrounded by an elastic body and in particular a body with variable volume or variable external dimensions. The elastic body is used in particular as a sealing body and can be for example designed in the manner of an elastomeric ring. Advantageously, the provision of the elastic body seals the façade anchor against the insulation boards. By providing the elastic body, a residual gap between the anchor and the façade insulation boards can be filled, so that the ingress of moisture is avoided in the façade and ultimately damage to the wall is prevented. For example, the elastic body may be compressed during installing of the façade so that the anchor has a small outer diameter. The compression can be realized for example by a paper sleeve, which surrounds the elastic body outer surface. Once the façade is constructed and a gap between the façade and façade anchor is present, the paper tube can be removed. The elastic body expands and then seals the façade anchor to the façade, in that the gap is closed.

According to a development of the invention support ribs extend from a support portion of the sleeve. In particular, the support ribs extend radially from the sleeve. Free edges of the support ribs can, at least in sections, taper in the thickness dimension toward the edge in the manner of knife blades. Advantageously, the attachment of the insulation is simplified by providing the blade-like edges. The insulation panels, which are typically made of a plastic material, can be pressed by the craftsman on site at the construction onto the façade anchor. The support ribs automatically cut, as a consequence of their knife-blade-like edges, automatically into the insulation board so that a complete covering of the façade anchor can be achieved with the insulating material. The installing of the insulation done in this way is both rapid and complete.

While the insulation panels can be applied in a particularly simple manner due to the provision of blade-like edges on the support ribs, it can, depending on the insulating material and the outer diameter of the sleeve, be advantageous to introduce a recess in the insulating material for the sleeve. For example, a semicircular recess can be formed on the edge of the insulation board by removal of insulation material with a file or rasp or by cutting the insulation board with a hot metal filament. For example, a hole may be provided in the insulation board corresponding to the outer diameter of the sleeve and the insulation board can be pressed onto the anchor in the longitudinal direction.

According to a development of the invention, an expansion element, which is insertable into the recess, is provided for fixing the façade anchor to the building wall. The attaching means is introduced in particular in the expansion element and in the receptacle of the façade anchor for fixing of the same to the building wall. By the provision of the expansion element a fast and reliable securing of the façade anchor on the building wall can be achieved. Regardless of the curing of the compensating material, the façade anchor is secured by the expansion element to the building wall. The expansion serves to secure the façade anchor in the time in which the compensating material has not yet cured. The expansion element provides a basic level of security.

The expansion element may be, for example, part of the façade anchor. For example, the expansion element may be integrally formed with the sleeve or the support portion having the support surface. For example, the expansion element can be implemented separately. The expansion element is then not part of the façade anchor. In particular, commercial dowels can be used as expansion element.

To set the fastener or the expansion element on the building wall, a filler or another curable material can be introduced in the recess. For example, an adhesive can be inserted into the recess. The expansion element can then be secured in the recess together with the compensating material or other curable material.

The provision of the expansion element is optional. According to an embodiment of the invention, for example, the expansion element can be dispensed with. The fastening means, which is inserted into the recess, can be for example adhesively fixed in the recess.

According to a development of the invention, the façade anchor can be integrally formed. In this case, in particular, the sleeve with the support ribs and the contact element having the support surface are realized in one piece. Further, the expansion element can be implemented as part of the façade anchor or be formed on the contact element. Advantageously, the manipulation of the façade anchor can be simplified by the integral design.

Alternatively the façade anchor can be made in several parts. In particular, the sleeve with the support ribs, the contact element with the supporting surface, and the expansion element can be constructed as separate components. The separate components can advantageously be customized and designed according to requirements. In a simple manner the various components can be manufactured from different materials. For example, the contact element can be manufactured from steel, while the expansion element is made of plastic. The sleeve with the support ribs may be formed for example as a multi-component plastic part. For the free end portion a soft, easy to cut plastic can be used, while for the remainder a hard or resistant material, such as glass fiber reinforced plastic, is used. The provision of the sleeve made of plastic ensures, firstly, that no thermal bridges are formed in the façade, as would be the case in particular for façade anchors made of metallic materials. In addition, through the use of cuttable plastic in the free end region, a trimming or length adjustment of the free end of the façade anchor is easily achieved. By contrast, it can be ensured by the provision of a fiber-reinforced plastic in the support section that the façade anchor is designed to accommodate the load path and that the forces to be supported do not damage the façade anchor, the building wall or the newly manufactured façade.

As expansion element, for example, a commercially available plug or dowel can be used, which is available inexpensively in large quantities.

According to a development of the invention, the façade anchor is used for receiving an eyebolt (screw ring). For example, the eyebolt serves as a connection means for securing the scaffolding on the façade anchor. For this purpose, in particular, a threaded portion of the eyebolt is introduced into a receptacle in the façade anchor. The securing of the scaffold to the eyebolt occurs in the region of the ring head. Particularly in the area of the ring head an eyelet is formed, to which the scaffolding or an anchor of the scaffolding can be attached.

The eyebolt can be provided optionally at the same time as a fixing means for fixing the façade anchor on the façade wall. In this case the shank of the eyebolt is passed through the receptacle of the façade anchor into the region of the recess. There, the expansion element is spread by means of the eyebolt so the façade anchor is secured by the expansion element to the building wall.

The particular advantage of the invention is that, by the application of the compensating material, it can be ensured in simple manner that the façade anchor is supported over its entire support surface indirectly on the building wall, and that the forces are transmitted via the support surface to the building wall. Since the building wall is usually formed with an uneven surface, only by the provision of the compensating material is surface contact made possible. In the absence of the compensating material there is a risk that the supporting surface rests against the building wall locally or, in an extreme case, at only a few points. In this case, the forces to be supported could lead to unacceptably high local load peaks, which ultimately result in damage to the façade anchor or in its failure.

According to a development of the invention, the compensating material is additionally introduced into the recess. Advantageously the compensating material acts in this case in the manner of an adhesive for the expansion element inserted into the recess or whatever fastener may be introduced into the recess. The compensating material provides additional stability when setting the façade anchor on the building wall. This is especially true when the compensating material is in the manner of an adhesive, for example in the manner of a two-component adhesive.

According to a development of the invention, an eyebolt is introduced in the receptacle of the façade anchor and used as an attachment means for securing the scaffolding. In particular, it may be provided that via the attachment means at the same time the façade anchor is fixed to the building wall. The attachment means thereby serves simultaneously as the attachment means for façade anchor. For example, an eyebolt as attaching means can be guided through the façade anchor into the building recess. The securing of the scaffolding takes place particularly in the eye of the eyebolt.

According to a development of the invention, an insulation is extensively attached to the surface of the building wall for the production of façade, with a thickness of insulation selected relative to a longitudinal extension of the façade anchor so that the façade anchor protrudes from the insulation with the free end portion facing away from the supporting surface thereof.

Advantageously, taking advantage of the protrusion of the anchor from the façade insulation, a mineral outer layer applied over the insulation layer all the way directly up to the anchor. A contamination of the anchor eyebolt here is protected by the surrounding free edge area of the façade anchor. Thereby it is prevented that the eyebolt has mineral applied to it, and prevented that the newly produced outer layer is damaged when removing the eyebolt from the façade anchor.

According to a further development of the invention, for the dismantling of the scaffolding, the eyebolt is removed from the securely attached façade anchor and the façade anchor is shortened by cutting the free protruding end portion so that it is flush with the mineral outer layer. Advantageously, following the shortening of the façade anchor after the production of the outer layer, the optical appearance of the façade can be improved. In particular, a closure body can be inserted into the receptacle of the façade anchor, so that the opening of the façade anchor is closed. The closure body may be, for example, visually matched to the façade design.

Further advantages, features and details of the invention can be seen from the further dependent claims and the following description. The disclosed features may be relevant to the invention individually or in any combination, respectively. Features and details of the present invention, described with regard to the structural arrangement, are applicable also in connection with the inventive method, and vice versa. Thus the disclosure of individual aspects of the invention in particular embodiments can relate to other embodiments. The drawings are merely exemplary for explaining of the invention and have no limiting character.

Figure 2:
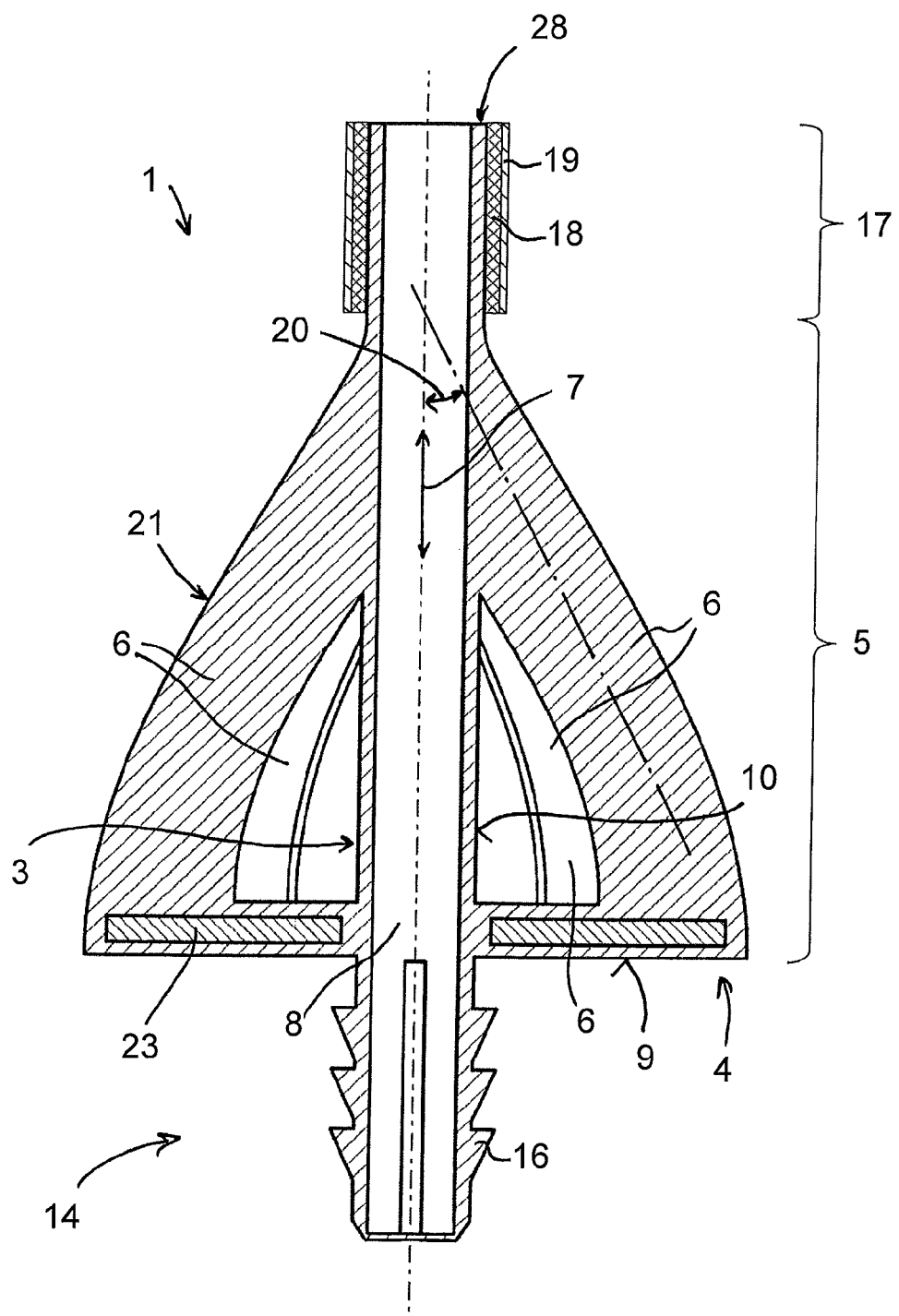
Figure 3:
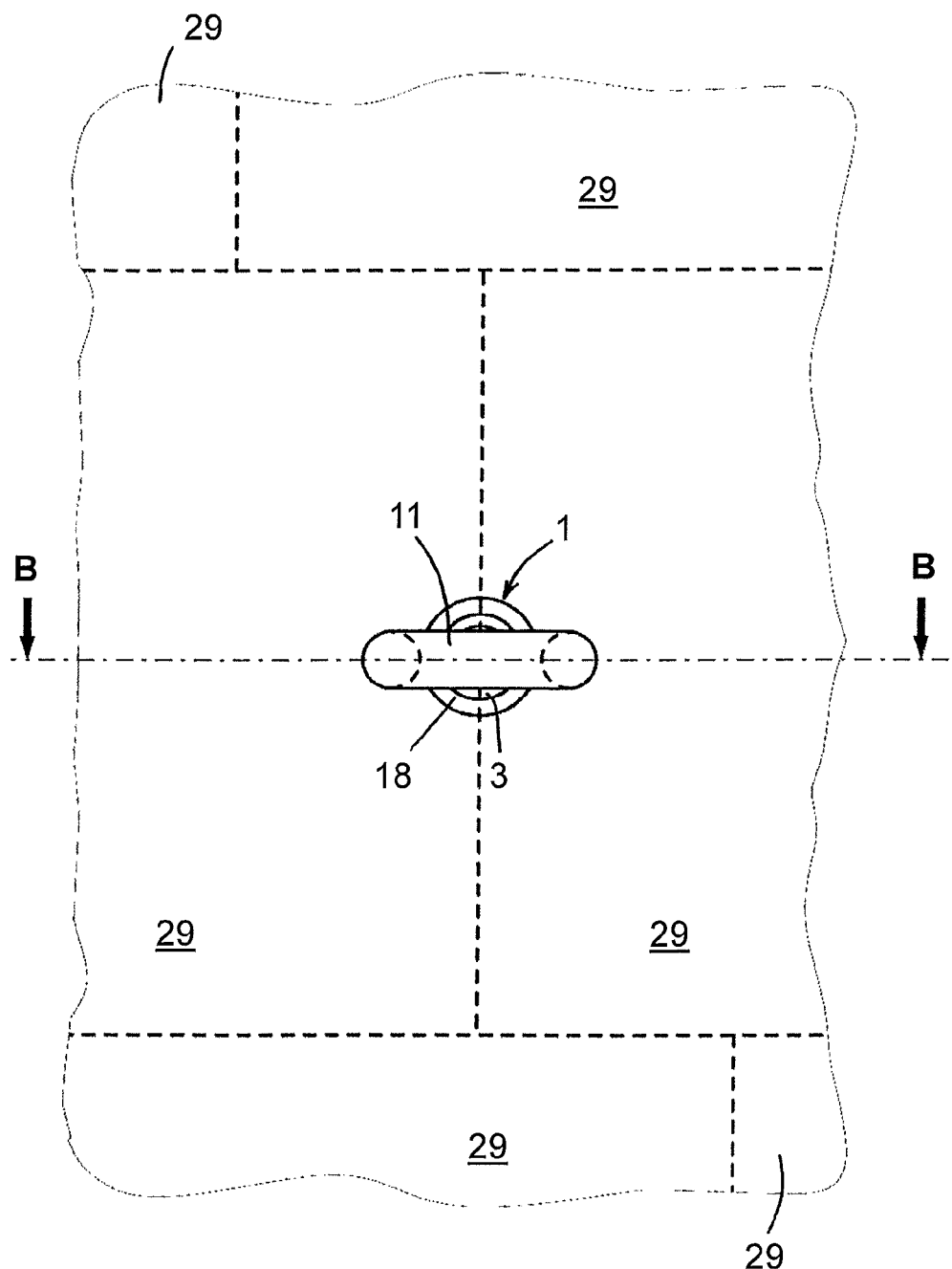
Figure 4:
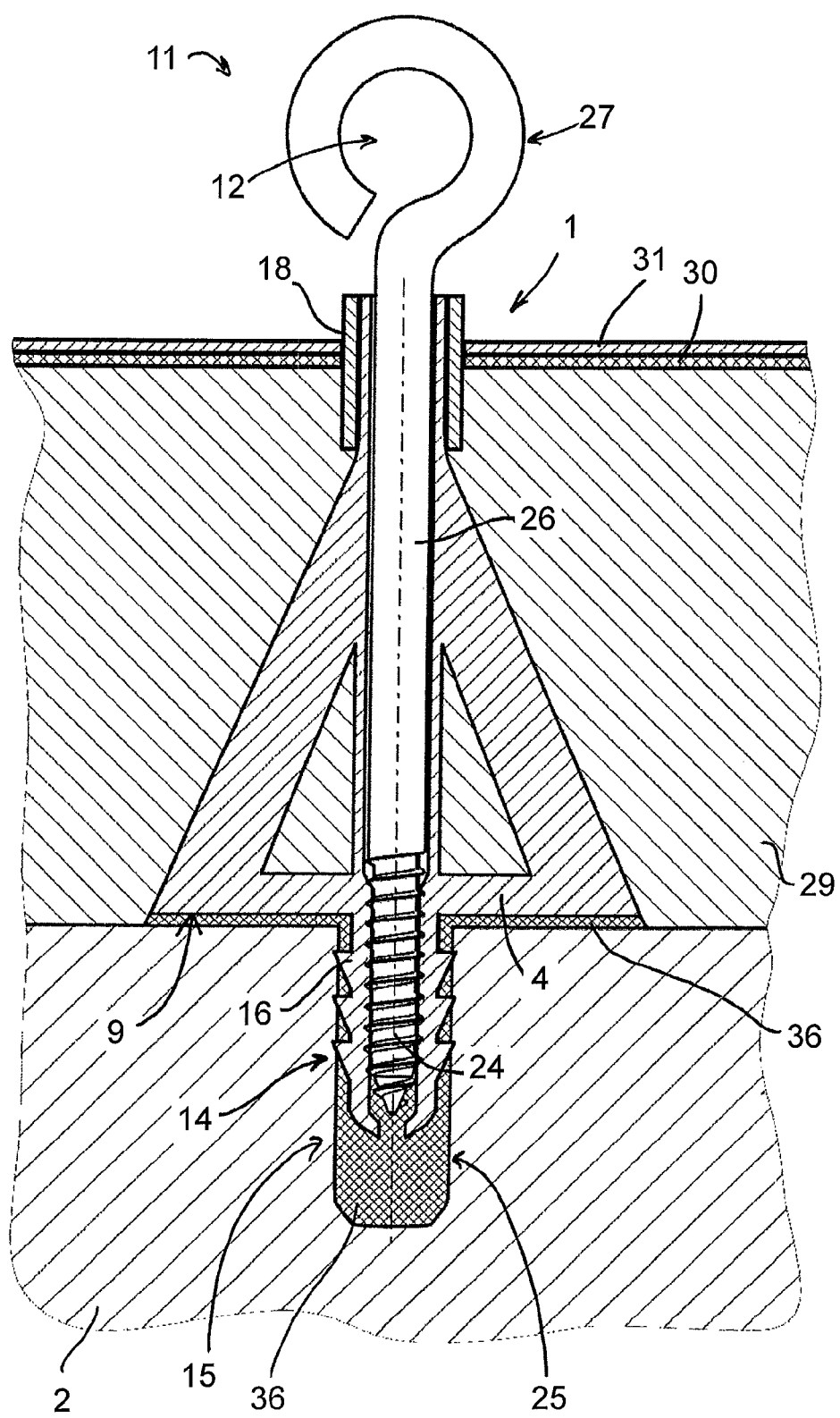
Figure 5:
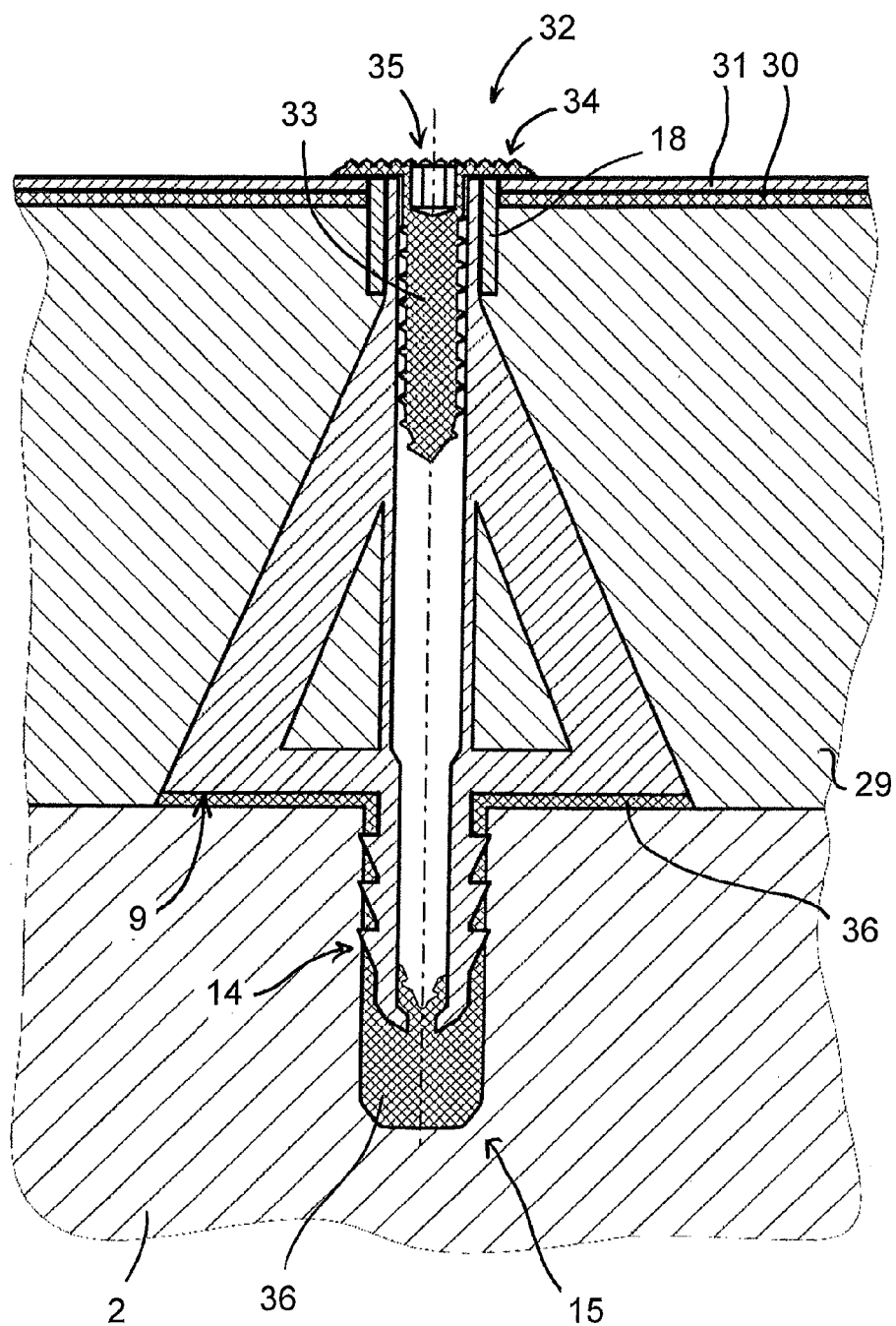
Figure 6:
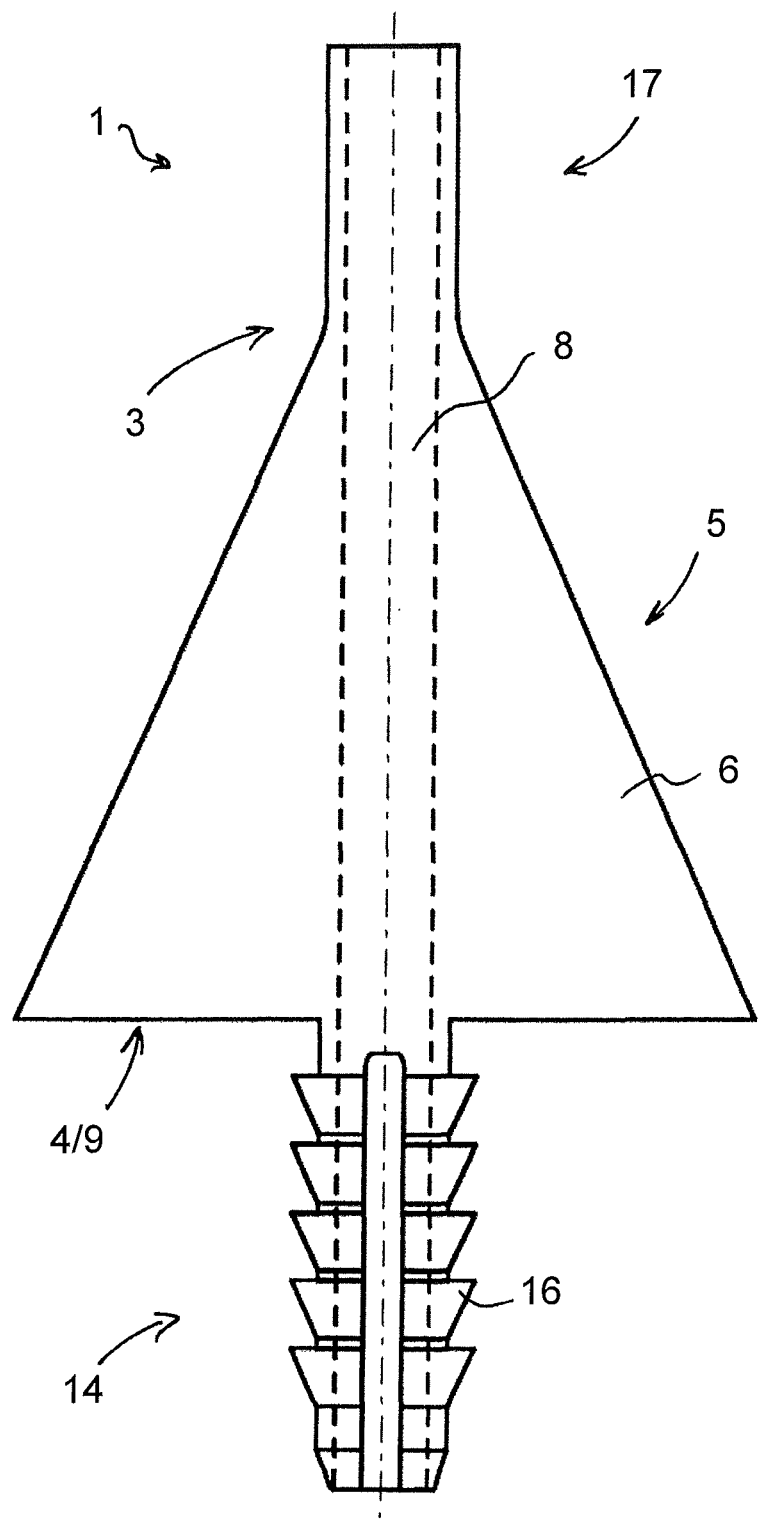
Figure 7:
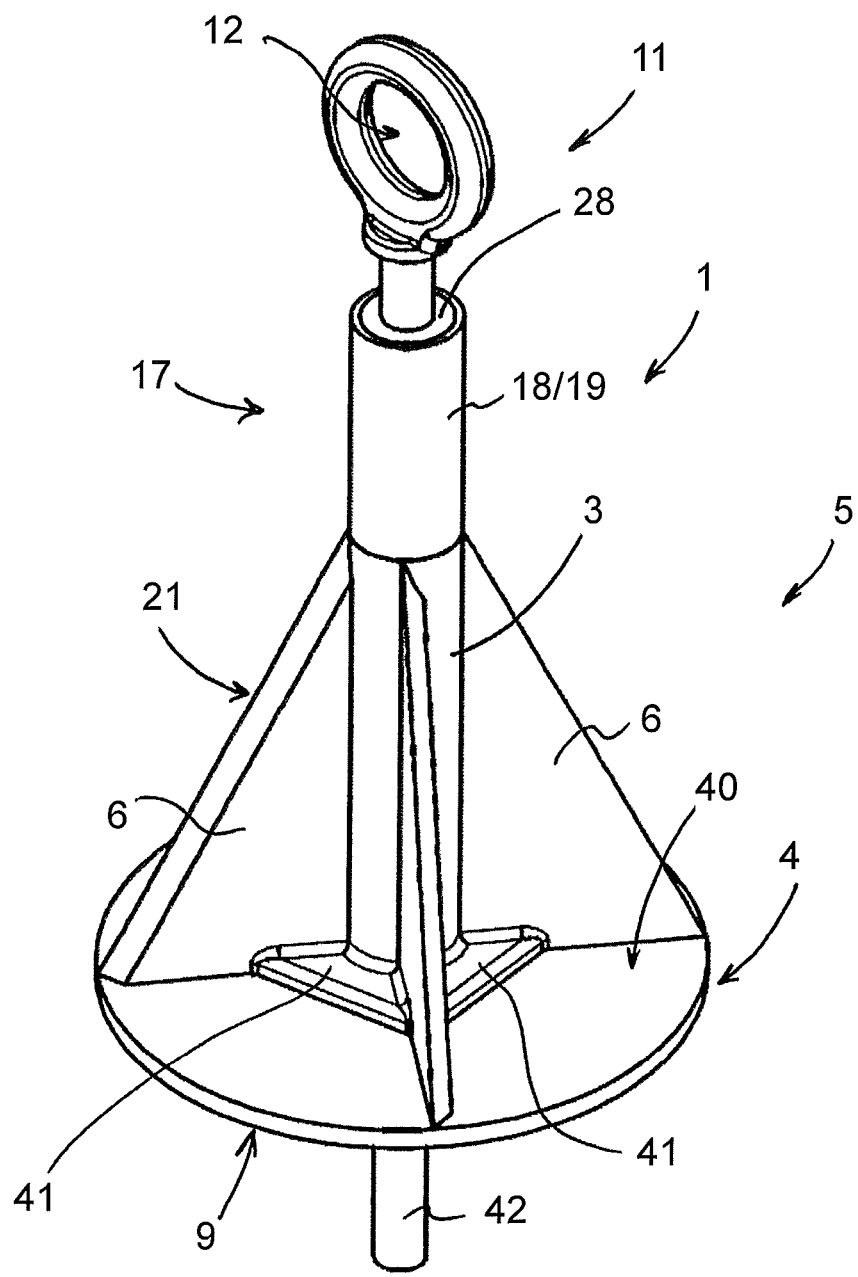
Figure 8:
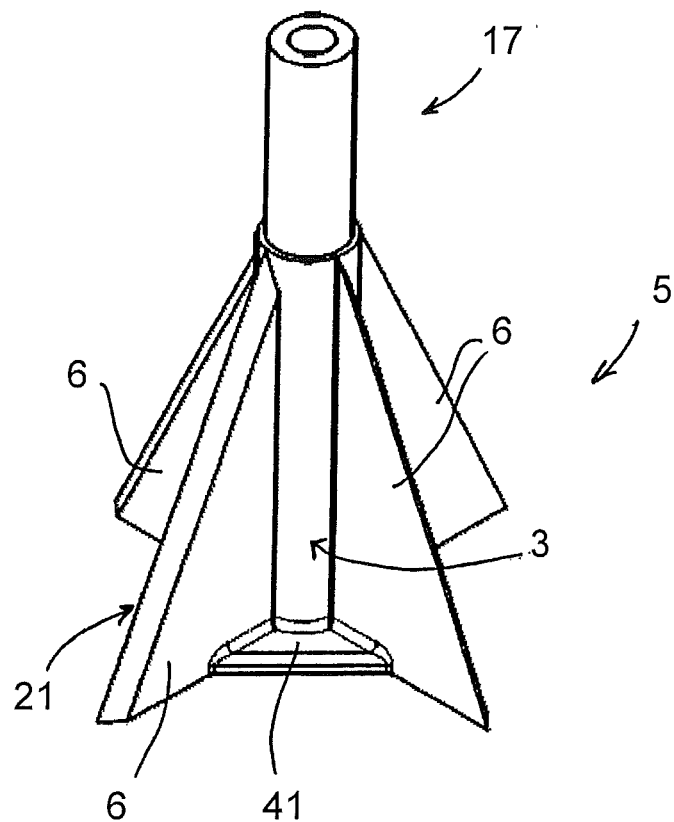
Figure 9:
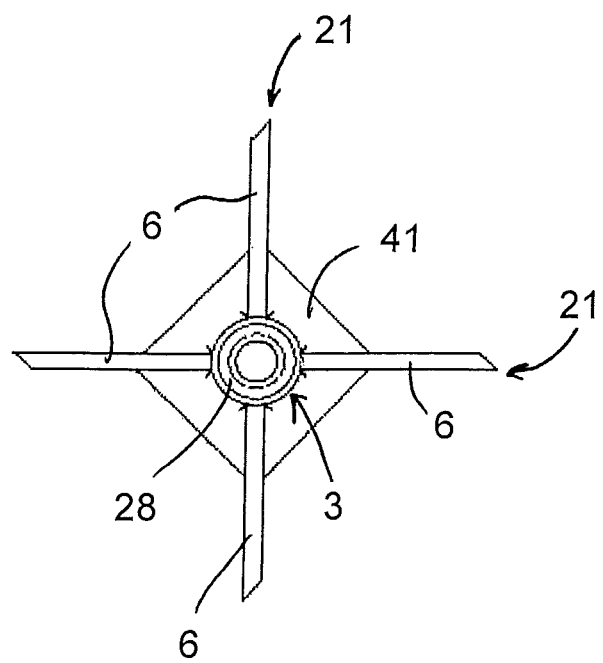
Figure 10:
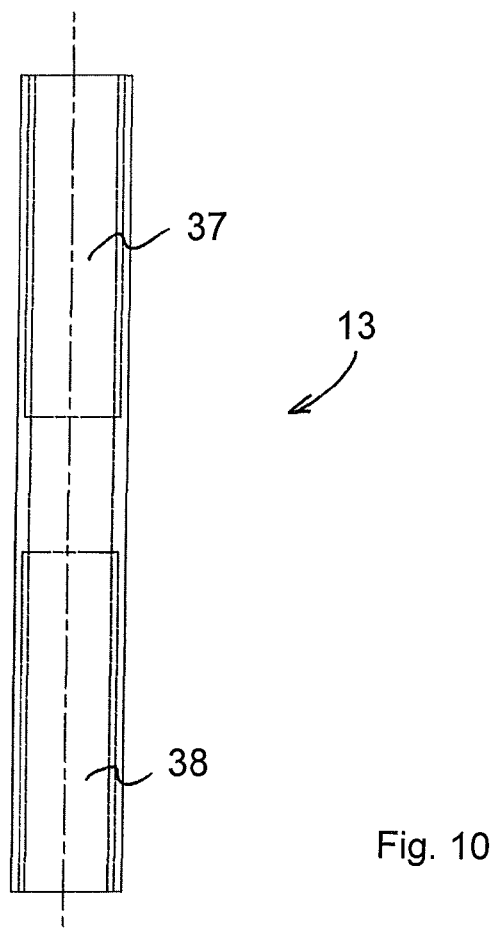
Figure 11:
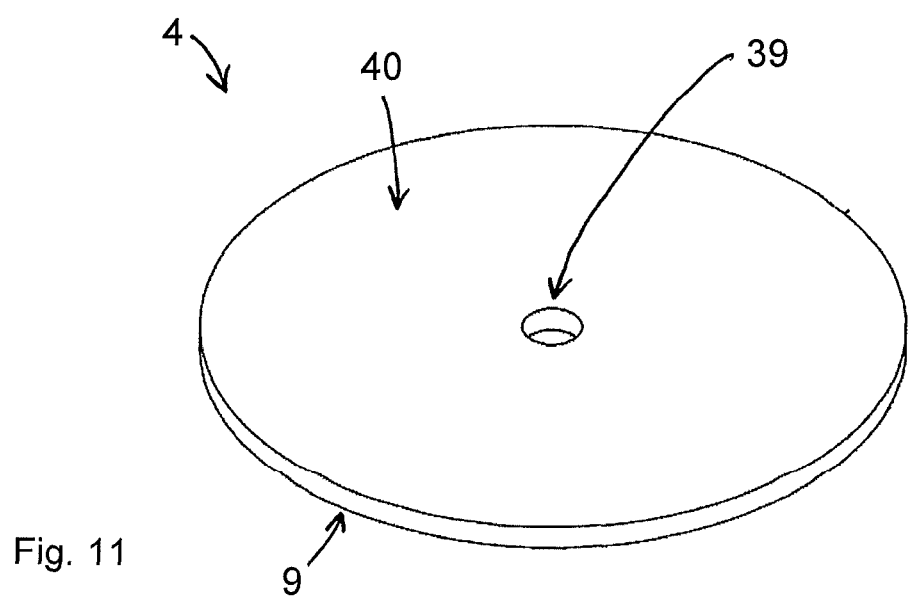
Figure 12:
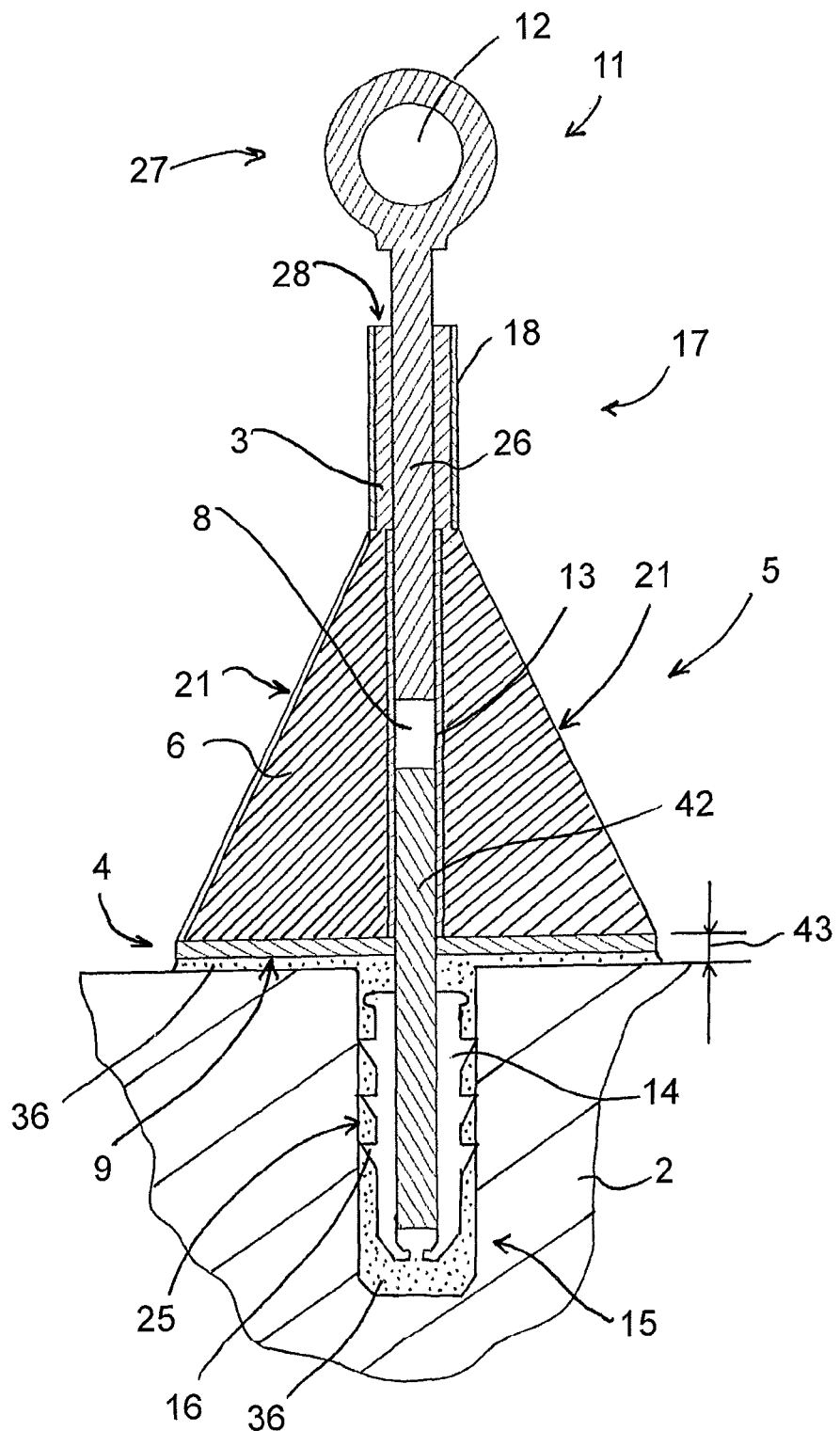

There is shown in:

FIG. 1 a frontal plan view of a first embodiment of a façade anchor for fixing of a scaffold to a building wall, FIG. 2 a sectional view of the façade anchor of FIG. 1 according to section AA, FIG. 3 a plan view of a façade the anchor of FIG. 1 having façade, FIG. 4 a sectional view of the façade according to FIG. 3 for the section BB, FIG. 5 the façade anchor in the façade as shown in the FIG. 3, with a closure element, FIG. 6 a side view of a second embodiment of the façade anchor for securing the scaffolding on the façade, FIG. 7 a perspective view of a third embodiment of the façade anchor provided with an Eyebolt screwed in, FIG. 8 a sleeve of the façade anchor of FIG. 7 with supporting ribs radially projecting from the sleeve in a perspective view, FIG. 9 the sleeve of FIG. 8 with the support ribs in a plan view, FIG. 10 a threaded insert provided in the sleeve, FIG. 11 a contact element of the façade anchor of FIG. 7 in a perspective view, and FIG. 12 a sectional view of a structural arrangement according to the invention with the façade anchor according to FIG. 7

A façade anchor 1 for fixing of a scaffold to a building wall 2 as shown in FIGS. 1 and 2 comprises, as essential components, a sleeve 3, an abutment or contact element 4 and a plurality of supporting ribs 6, which project radially from the sleeve 3 in the region of a support portion 5 of the same. The sleeve 3 extends along a direction of extension 7 of the façade anchor 1 and is thin-walled. A cylindrical receptacle 8 of the sleeve 3 extends in the direction of extension 7. The contact element 4 extends out in the radial direction from the sleeve 3. On the contact element 4 a flat support surface 9 is provided oriented perpendicular to the direction of extension 7. The support portion 5 comprises support ribs 6 as support elements arranged distributed regularly about an outer jacket surface 10 of the sleeve 3. The support ribs 6 are provided in the manner of braces between the contact element 4 and the sleeve 3.

The façade anchor 1 is used for example to secure a scaffold on a building wall 2 and carry out work on a façade. To this end, an eyebolt or ring screw 11 is fixed to the building wall 2 by means of the façade anchor. 1 An eyelet 12 of the eyebolt 11 spaced from the building wall 2 is then used that scaffold to the building wall 2. Once the scaffold is erected and secured to the building wall 2, the work can begin on the façade. In particular, the façade anchor 1 can be used when an external insulation is applied on the building wall 2. For example, the façade anchor 1 can be provided as a permanent façade anchor 1 for a thermal insulation composite system, wherein the façade anchor 1 permanently remains after installing of the composite thermal insulation system on the façade.

The thin-walled sleeve 3 with the receptacle 8 can be divided into two areas according to their functional characteristics. The support portion 5 is defined by the supporting ribs 6. Adjoining an end of the support portion 5 in the direction of extension 7 is a free end portion 17. The free end portion 17 serves as a compensation portion for the façade anchor 1. It is provided on the side of the support portion 5 opposite to the contact element 4. The free end portion 17 of the sleeve 3 is formed substantially cylindrical. The outer surface 10 of the sleeve 3, in the region of the compensation portion 17, is surrounded by an elastomeric ring 18. The elastomeric ring 18 is designed as a compressible elastomeric ring 18 and is compressed in the radial direction shown in the illustrated configuration. The compression of the elastomeric ring 18 is effected by paper tube 19 surrounding the elastomeric ring 18 on the outer side.

On the side of the façade anchor 1 opposite the free end portion 17 an expansion element 14 is provided, which is designed in the manner of a dowel. The expansion element 14 is inserted during assembly of the façade anchor into a recess 15 provided on the building wall 2. The expansion element 14 is in the form of an anchor and has on the outer periphery radially projecting barb-like protrusions 16.

According to the present embodiment of the façade anchor the expansion element 14 is formed as an integral part of the façade anchor 1. It is realized in one piece in particular together with the sleeve 3.

The contact element 4 adjoins the support section 5 of the façade anchor 1 so that the support surface 9 of the contact element 4 is provided immediately adjacent to the expansion element 14 of the façade anchor 1. On a side of the supporting section 5, opposite the support surface 9 of the sleeve 3, support ribs 6 extend to the contact element 4. The contact element 4 is, like the expansion element 14, formed integrally on the sleeve 3. The plate-shaped contact element 4 extends radially from the sleeve 3. The contact element 4 in this case has a circular base.

The support ribs 6 are also integrally formed on the outer side of the sleeve 3. They extend at an angle 20 of approximately 30° to the direction of extension 7 of the sleeve 3 to an outer edge region of the contact element 4. The support ribs 6 are constructed and arranged in the manner of struts or braces.

The free boundary edge 21 of the support ribs 6 are formed knife-blade-like, with a thickness dimension 22 of the support rib 6 reduced towards the edges 21. The edges 21 of the façade anchor 1 being in the form of knife blades makes it possible to use insulating material in the form of insulation panels 29 in forming the sound attenuating dressing. Therein, the damper plate 29 is pressed against the knife blade-shaped edges 21 of the support ribs 6. The support ribs 6, due to the knife blade form of their edges 21, cut into the insulation material under contact pressure. The insulation board 29 can thus be applied directly against the façade anchor 1 with the result that the building wall 2 in the area of façade anchor 1 can be completely insulated in a simple manner.

According to a not illustrated alternative embodiment of the invention, the peripheral edges 21 may have a single-sided wedge shape extending obliquely between a first flat side of the support ribs 6 and an opposite second flat side of the support ribs 6. It is likewise possible to dispense with the provision of a knife blade shape at the edges 21. The edges 21 can be formed, for example, blunt or rounded in this regard. Depending on the thickness dimension 22 of the supporting ribs 6, the insulating board 29 could however be pressed directly against the façade anchor 1, or it may be arranged that a corresponding groove is provided on the insulating board 29 for receiving the support ribs 6.

The sleeve 3 with the support portion 5 and the molded-on contact element 4 can be prepared for example by means of plastic injection molding and made in one piece. In particular, to improve the strength and stability of the façade anchor 1, a jacketed core 23, in particular a circular ring-shaped steel core 23, can be provided in the contact element 4. The core 23, like the contact element 4, extends radially with respect to the sleeve 3 and perpendicular to the direction of extension 7.

A structural arrangement with the façade anchor 1 in an installed condition is shown in FIGS. 3 and 4. The façade anchor 1 is seated with the expansion element 14 inserted in a recess 15. At the same time the façade anchor 1 is supported extensively with the support surface 9 of the contact element 4 against the building wall 2. An eyebolt 11 is inserted in the elongated receptacle 8 formed in the façade anchor 1. The eyebolt 11 spreads with its threaded portion 24 the expansion element such that the barb-shaped formations 16 secure the façade anchor 1 on the wall 25 of the recess 15.

To further improve the fixing of the façade anchor 1 to the building wall 2 a compensating material 36 is provided between the wall 25 of the recess 15 on the one hand and the expansion element 14 on the other hand, as well as between the support surface 9 of the façade anchor 1 and the building wall 2. The compensating material 36 is preferably a self-curing adhesive or a 2-component adhesive. The compensating material 36 ensures that the façade anchor 1 is held secured to the building wall 2 even in the absence of a screwed-in eyebolt 11.

The compensating material 36 is further provided between the contact element 4 support surface 9 of the façade anchor 1 and the building wall 2. The compensating material 36 serves in particular to compensate for irregularities on the building wall 2. The compensating material 36 is necessary to achieve a full-surface contact of the support surface 9 to the building wall 2 and to accurately transmit the forces from the façade anchor 1 to the building wall 2. The compensating material 36 should be formulated in this context, in particular for receiving compressive forces.

A shaft 26 of the eyebolt 11 extends in the direction of extension 7 and connects the threaded section 24 of the eyebolt 11 with the ring head 27 of the eyebolt 11 having an eyelet 12. The shaft 26 extends here in the support section 5 and in the free end portion 17 of the sleeve 3. It projects beyond an end face 28 of the free end portion 17.

The insulation of the building wall 2 is composed of a plurality of insulation boards 29. The insulation panels 29 are all glued for example with the building wall and 2 on one of the building wall 2 facing away from the flat side with a fabric layer 30 and a mineral outer layer 31 coated as an external façade surface.

The façade anchor 1 protrudes with the free end portion 17 out beyond the mineral outer layer 31. The mineral outer layer 31 may be plastered on the façade anchor 1, without the façade anchor 1 eyebolt 11 being contaminated during plastering or adhering to the outer layer 31.

After the production of the thermal insulation composite system comprising the insulation 29, the fabric layer 30 and the mineral outer layer 31, the eyebolt 11 can be removed from the façade anchor 1. Since the mineral outer layer 31 is applied only up to the free end portion 17 of the sleeve 3 and no contact is formed between the eyebolt 11 and the mineral outer layer 31, the eyebolt 11 can be unscrewed from the façade anchor 1, without it leading to a damaging of the newly produced mineral outer layer 31. The free end portion 17 serves as a kind of contamination protection for the eyebolt 11. The façade anchor 1 then remains permanently in the building wall 2.

As shown in FIG. 5, the receptacle 8 of the sleeve 3 can be closed by a closure body 32 when the eyebolt 11 is removed. The closure body 32 may comprise for example a head portion 34 fully covering the sleeve 3 in the region of the face side 28, screwed into the receptacle 8 via a threaded shaft 33. The head portion 34 may have a grained or otherwise textured surface, which is a first approximation of the surface texture of the mineral outer layer 31. Additionally, the closure body 32 may be provided a cone 35 for insertion of a tool, or a different type of tool receptacle. In this way, the closure body 32 may be repeatedly introduced into or removed from the receptacle 8. Optionally, it may be provided that at the free end area 17 and/or the support portion 5 of the sleeve 3 is provided with an internal thread for guiding of the threaded shaft 33 of the closure body 32. Advantageously, moreover, the façade anchor 1 prior to insertion of the closure body 32 is provided so that the free end region 17 is cut to length so that the face side 28 is substantially flush to the mineral outer layer 31 or only slightly offset therefrom. In addition, the paper tube can 19 can be removed after the lining of the building wall 2 with the insulation 29 or the application of the mineral outer layer 31, so that the elastomeric ring 18 expands and the façade anchor 1 seals against the insulation.

FIG. 6 shows a further embodiment of a façade anchor 1 according to the invention. In this case, the support portion 5, the expansion element 14 and the free end area 17 are formed fixed to the façade anchor 1. In support portion 5 a cone 6 is formed as a supporting element. The support cone 6 also defines the contact element 4 with the support surface 9. The support cone 6 can for example be designed as a hollow cone with a jacket of constant or variable thickness.

A third embodiment of a façade anchor 1 is shown in FIGS. 7 to 11. This is a multi-part façade anchor 1, comprising as essential components the sleeve 3 with the radially projecting support ribs 6 and a bearing or contact element 4 with the support surface 9. In addition, a threaded insert 13 is provided as part of the façade anchor 1, which is provided in the sleeve 3 and forms the receptacle 8. The threaded insert 13 has threads 37, 38 provided on both sides.

In the sleeve 3, a step is formed in the region of the transition between the free end portion 17 and the support portion 5, wherein an outer diameter of the sleeve 3 in the region of the free end portion 17 is smaller than an outer diameter of the sleeve 3 in the support portion 5. The step is provided in order to achieve a substantially equal outer diameter for the façade anchor 1 after the seating of the compressed elastic body 18 with the paper tube 19 in the region of the free end 17.

The contact element 4 is in particular disk-shaped and has a concentric bore 39. A first flat side of the contact element 4 defines the support surface 9. In the mounted state of the façade anchor 1 is frontally applied to the sleeve 3 and the contact element 4 facing underside of the support ribs 6 a second flat side 40 of the contact element. 4 Between the supporting ribs 6 are connecting portions 41, which likewise have a flat bottom, which is attached to the flat side 40 of the contact element 4 extend.

In the mounted state of the façade anchor 1 in particular an eyebolt 11 is inserted into the receptacle 8 through the free end portion 17 and seated in a first thread 37 of the threaded insert 13. In the second thread 38 of the threaded insert 13 a threaded bolt 42 is used as the fastening means. For example, the threaded insert 13 and the fastener 42 are made of a metallic material. The sleeve 3 with the projecting support ribs 6 is, for example, made of plastic, wherein the sleeve 3 is made in the free end region 17 of a soft plastic material and the sleeve 3 in the region of the support portion 5 and the support ribs 6 is produced from a reinforced plastics material, for example of a glass fiber reinforced plastic material. The eyebolt 11 is preferably also made of a metallic material. For example, the plastic is cast around the threaded insert 13 during the molding manufacture of the sleeve 3.

A structural arrangement according to the invention with the façade anchor 1 according to the third embodiment is shown in FIG. 12. A recess 15 provided in a building wall 2 serves to receive a dowel as expansion element 14. In addition, the façade anchor 1 with the support surface 9 is initially set against the building wall 2. To compensate for unevenness, in particular in the building wall 2, the compensating material 36 is provided between the building wall 2 on the one hand and the support surface 9 of façade anchor 1 on the other. The compensating material 36 is further provided in the recess 15. By the provision of the compensating material 36 a planar support of the façade anchor 1 on the building wall 2 is achieved the attachment of the expansion element 14 in the recess 15 is improved. A further securing is made via the head portion 34, which is secured on the one hand in the thread 38 of the threaded insert 13 and on the other hand in the expansion element 14. The eyebolt 11 is fixed in the first thread 37 of the threaded insert 13.

The installation of the façade then is accomplished, as already described, by the application of insulation panels 29 against the building wall 2 and the façade anchor 1, by providing a mineral outer layer 31, through the engagement in the façade anchor 1 in the region of the free end portion 17 and the insertion of the closure body 32 into the receptacle 8 of the sleeve 3. In particular, a thickness 43 of the contact element 4 and that of the compensating material 36 provided between the contact element 4 and the building wall 2 is chosen such that a disengagement of the insulation board 29 is not required. The thickness 43 is preferably less than 15 mm and more preferably not greater than 10 mm.

The same components and component features are identified by the same reference numerals.

The invention claimed is:

1. A method for at least temporarily attaching a scaffold to a building wall (2) comprising the steps of:
   forming a recess (15) in the building wall (2);
   seating an expansion element in (14) the recess (15);
   applying an adhesive compensating material (36) on the building wall (2) in the region of the recess (15) and surrounding the recess (15);
   applying a support surface (9) of a façade anchor (1) against the compensating material (36);
   attaching the façade anchor (1) to the building wall (2) via a wall attaching means (42), wherein the wall attaching means (42) is introduced into a receptacle (8) of the façade anchor (1) and into the expansion element (14),
   introducing a scaffold attaching means (11) into the receptacle (8) of the façade anchor (1), and
   attaching the scaffold to the scaffold attaching means (11),
   wherein an insulation material is applied to the surface of the building wall (2), wherein a thickness of the insulation material is chosen such that a free end portion (17) of the façade anchor (1) facing away from the supporting surface (9) at least partially protrudes from the insulation material
   wherein, after the provision of the insulation material, a mineral outer layer (31) is applied on the insulation material, and that the mineral outer layer (31) is also applied to the free end portion (17) of the façade anchor (1)
   further comprising dismantling of the scaffold, wherein the scaffold attaching means (11) is removed from the receptacle (8) of the façade anchor (1) and the façade anchor (1) is made flush with the mineral outer layer (31) by trimming in the area of the free end portion (17)
   wherein a closure body (32) is inserted into the receptacle of the façade anchor (1), wherein the closure body (32) projects with an edge on the outside of the mineral outer layer (31).

2. The method according to claim 1 wherein the adhesive compensating material (36) is formed from a curable material.

3. The method according to claim 1, wherein the scaffolding attaching means (11) is in the form of an eyebolt, and wherein the scaffolding is attachable in an eyelet (12) of the eyebolt.

4. The method according to claim 1 wherein the façade anchor (1) is made of at least two different materials.

5. The method according to claim 1, wherein the compensating material (36) is formed from a pressure-stable material.

6. The method according to claim 1, wherein the compensating material (36) is provided by the mixing of two material components.

7. A method for at least temporarily attaching a scaffold to a building wall (2) comprising the steps of:
   forming a recess (15) in the building wall (2);
   seating an expansion element in (14) the recess (15);
   applying an adhesive compensating material (36) on the building wall (2) in the region of the recess (15) and surrounding the recess (15);
   applying a support surface (9) of a façade anchor (1) against the compensating material (36);
   attaching the façade anchor (1) to the building wall (2) via a wall attaching means (42), wherein the wall attaching means (42) is introduced into a receptacle (8) of the façade anchor (1) and into the expansion element (14);
   introducing a scaffold attaching means (11) into the receptacle (8) of the façade anchor (1); and
   attaching the scaffold to the scaffold attaching means (11),
   wherein an insulation material is applied to the surface of the building wall (2), wherein a thickness of the insulation material is chosen such that a free end portion (17) of the façade anchor (1) facing away from the supporting surface (9) at least partially protrudes from the insulation material,
   wherein, after the provision of the insulation material, a mineral outer layer (31) is applied on the insulation material, and that the mineral outer layer (31) is also applied to the free end portion (17) of the façade anchor (1),
   further comprising dismantling of the scaffold, wherein the scaffold attaching means (11) is removed from the receptacle (8) of the façade anchor (1) and the façade anchor (1) is made flush with the mineral outer layer (31) by trimming in the area of the free end portion (17), and
   wherein a closure body (32) is inserted into the receptacle of the façade anchor (1), wherein the closure body (32) projects with an edge on the outside of the mineral outer layer (31).

* * * * *